United States Patent [19]

Phalon, Jr. et al.

[11] Patent Number: 5,068,508

[45] Date of Patent: Nov. 26, 1991

[54] COMPLAINT HOT BAR APPARATUS

[75] Inventors: Philip A. Phalon, Jr., Sudbury; Marius A. Caramiciu, Dracut; Robert C. DiGiovanni, Stow, all of Mass.

[73] Assignee: Raytheon Company, Lexington, Mass.

[21] Appl. No.: 590,734

[22] Filed: Oct. 1, 1990

[51] Int. Cl.$^5$ ................................................ B23K 3/03
[52] U.S. Cl. ................................................... 219/85.16
[58] Field of Search ............... 219/85.16, 85.22, 85.18, 219/85.19, 228, 233; 228/180.2, 44.7

[56] References Cited

U.S. PATENT DOCUMENTS

| | | | |
|---|---|---|---|
| 3,230,338 | 1/1966 | Kawecki | 219/85.16 |
| 3,608,809 | 9/1971 | Cushman | 228/180.2 |
| 4,654,507 | 3/1987 | Hubbard et al. | 219/233 |
| 4,768,702 | 9/1988 | Takahashi et al. | 228/44.7 |
| 4,828,162 | 5/1989 | Donner et al. | 228/180.2 |
| 4,851,648 | 7/1989 | Jacobs et al. | 219/85.16 |
| 4,855,559 | 8/1989 | Donner | 219/85.16 |
| 4,894,506 | 1/1990 | Woerner | 219/85.22 |
| 4,982,890 | 1/1991 | Schuster et al. | 219/85.16 |
| 5,016,804 | 5/1991 | Schuster et al. | 219/85.18 |

Primary Examiner—Geoffrey S. Evans
Attorney, Agent, or Firm—Walter F. Dawson; Richard M. Sharkansky

[57] ABSTRACT

A surface mount device (SMD) soldering assembly having a hot bar that pivots about a point at the center of its base to accommodate non-uniform surfaces, multi-layer circuit board flatness variations and soldering-lead height differences. The hot bar is moved toward the SMD by a main mounting bracket attached to a soldering machine until it contacts the leads to be soldered. When the hot bar contacts an uneven surface, a force is applied to a set of angularly mounted slides which are coupled to ends of a rocking bracket that has the hot bar mounted to its center section. Each angular slide is attached to a support plate at an angle such that it is tangent to an arc defined by the pivot point at the center of the base of the hot bar. As the angular slides move along such arc, the hot bar pivots and thereby adjusts to any unevenness so that optimum thermal contact is made with all the leads to be soldered.

14 Claims, 3 Drawing Sheets

COMPLAINT HOT BAR APPARATUS

The Government has rights in this invention pursuant to Contract No. N00030-86-C-0067 awarded by U.S. Navy.

BACKGROUND OF THE INVENTION

This invention relates to the attachment or removal of surface mounted devices (SMD) to and from printed circuit (PC) boards and in particular to an automated apparatus for soldering or unsoldering multi-leaded surface mounted devices on or from multi-layer boards (MLB).

Surface mounted devices include components with two leads such as resistors or capacitors and integrated circuit (IC) packages having anywhere from six to hundreds of leads. The integrated circuit packages typically have leads on two to four sides of such packages. Many methods have been used to attach components to printed circuit boards such as wave soldering, infrared radiant soldering and vapor phase soldering. In addition, hot bar soldering technology has become prominent with the evolution of multi-leaded devices.

In U.S. Pat. No. 4,855,559, "Adjustable Heater Collet", to Joseph E. Dorner and assigned to Hughes Aircraft Co., several hot bar devices are described. One prior art hot bar device provides a specifically sized, closely toleranced monolithic cavity created from a single piece of metal. The monolithic cavity is placed over an IC such that the cavity surrounds and makes thermal contact with the leads of an integrated circuit quad pack which leads extend from all four sides. Successful attachment of quad packs using current hot bar technology requires localized application of heat, sufficient to reflow the solder on the IC leads without reflowing the solder on nearby ICs. The successful removal of a quad pack requires that all of the leads be heated simultaneously and equally until all of the solder becomes liquid. The mass joining processes of wave soldering, infrared radiant soldering, and vapor phase soldering are not suitable for removal of quad packs because such processes do not allow for selectively melting the solder on the leads of the IC to be removed while not melting the solder joints of other components on the printed circuit board. U.S. Pat. No. 4,855,559, primarily describes a heater bar arrangement wherein guide means for the heater bar elements provide lateral motion of the heater bars parallel to the sides of an IC at the same time as the heater bars move inwardly toward the IC. The guide means are arranged appropriately with respect to one another such that the heater bar elements do not contact one another for a considerable distance as they move inward toward the IC. In this manner, a single adjustable heater bar arrangement is provided which accommodates both large and small ICs and permits the minute adjustments required to accommodate lot-to-lot variations in IC size.

However, in U.S. Pat. No. 4,654,507, "Solder Reflow Heater Bar Assembly", to Robert F. Hubbard and Joseph M. Jacobs and assigned to Hughes Aircraft Co., a solder reflow heater bar is generally described that can pivot with respect to the work in order to apply an even force over several leads being soldered. As is known in the art of reflow soldering, a printed circuit board carries pads thereon which are tinned with solder. A multi-leaded component is placed with its leads over the pads. When a heater bar is brought down into contact with the leads and heat applied, lack of compliance of the heater bar causes uneven force upon the leads resulting in unreliable soldering. Free pivoting of the heater bar does not control the initial angle of the heater bar resulting in lateral motion of the heater bar as it moves down into soldering position. Such lateral motion may move the leads to be soldered off their pads resulting in leads contacting adjacent pads or limited contact of the heater bar resulting in unreliable solder joints. Hubbard et al. provide a heater bar assembly that is pivoted and biased toward a central position. It attempts to reduce the distance of lateral motion of the heater bar with respect to the component leads as the heater bar is brought in contact with the leads, but the pivot point of the assembly is above the heater bar base so lateral forces, although reduced, are still produced that can move component leads.

Experience with fixed heater or hot bar soldering heads in automated equipment has resulted in the occurrence of poor solder joints due to variations in the flatness of the multi-layer board's surface after lamination, variation in the height of reflow solder paste provided to the soldering pads and skidding of components off the pads due to lateral movement of the hot bar soldering head.

SUMMARY OF THE INVENTION

Accordingly, it is therefore an object of this invention to provide a hot bar soldering assembly that provides compliance across height variations of surfaces to be soldered or unsoldered by having a pivot point at the center of the base of the hot bar.

It is a further object of this invention to provide a compliant hot bar soldering assembly that is easily mounted on an automatic soldering machine to provide continuous repetitive high quality soldering of multi-leaded devices without movement of such devices when contact is made with a hot bar.

The objects are further accomplished by providing a soldering assembly comprising a main member, means for coupling a support member to the main member, and soldering means coupled to the support member for providing a hot bar to a workpiece such as the leads of an integrated circuit, the hot bar having a pivot point about the center of the base of the hot bar when contacting the workpiece. The support member coupling means comprises a sliding means for coupling the support member to the main member with the motion of the sliding means being in a vertical direction. The soldering means comprises means for coupling a rocking bracket to the support member where the rocking bracket has a first pivot shaft and a second pivot shaft, the support member coupling means comprising a first sliding means attached to the first pivot shaft and a second sliding means attached to the second pivot shaft, and means mounted to the rocking bracket for heating the hot bar. The first sliding means and the second sliding means are disposed on the support member tangent to an arc defined by the pivot point at the center of the base of the hot bar.

The objects are further accomplished by a method of soldering with a compliant hot bar soldering assembly comprising the steps of providing means to mount a main member of the hot bar soldering assembly to a soldering machine, coupling a support member to the main member to provide one directional motion between the support member and the main member, coupling a soldering means comprising the compliant hot bar to the support member wherein the hot bar pivots about a point at the center of its base when contacting a workpiece.

The objects are further accomplished by a method of soldering with a compliant hot bar soldering assembly comprising the steps of securing a main member bracket of the soldering assembly to a soldering apparatus, coupling a support member to the main member bracket, coupling a rocking bracket to the support member, the rocking bracket having a first pivot shaft attached to a first sliding means on the support member and a second pivot shaft attached to a second sliding means on the support member, disposing a hot bar having a pivot point about the center of the base of the hot bar for compliance with non-uniform surfaces, and providing electric power to the hot bar from the soldering apparatus. The step of coupling the rocking bracket to the support member further comprises the step of disposing the first sliding means and the second sliding means on the support member tangent to an arc defined by the first pivot point.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
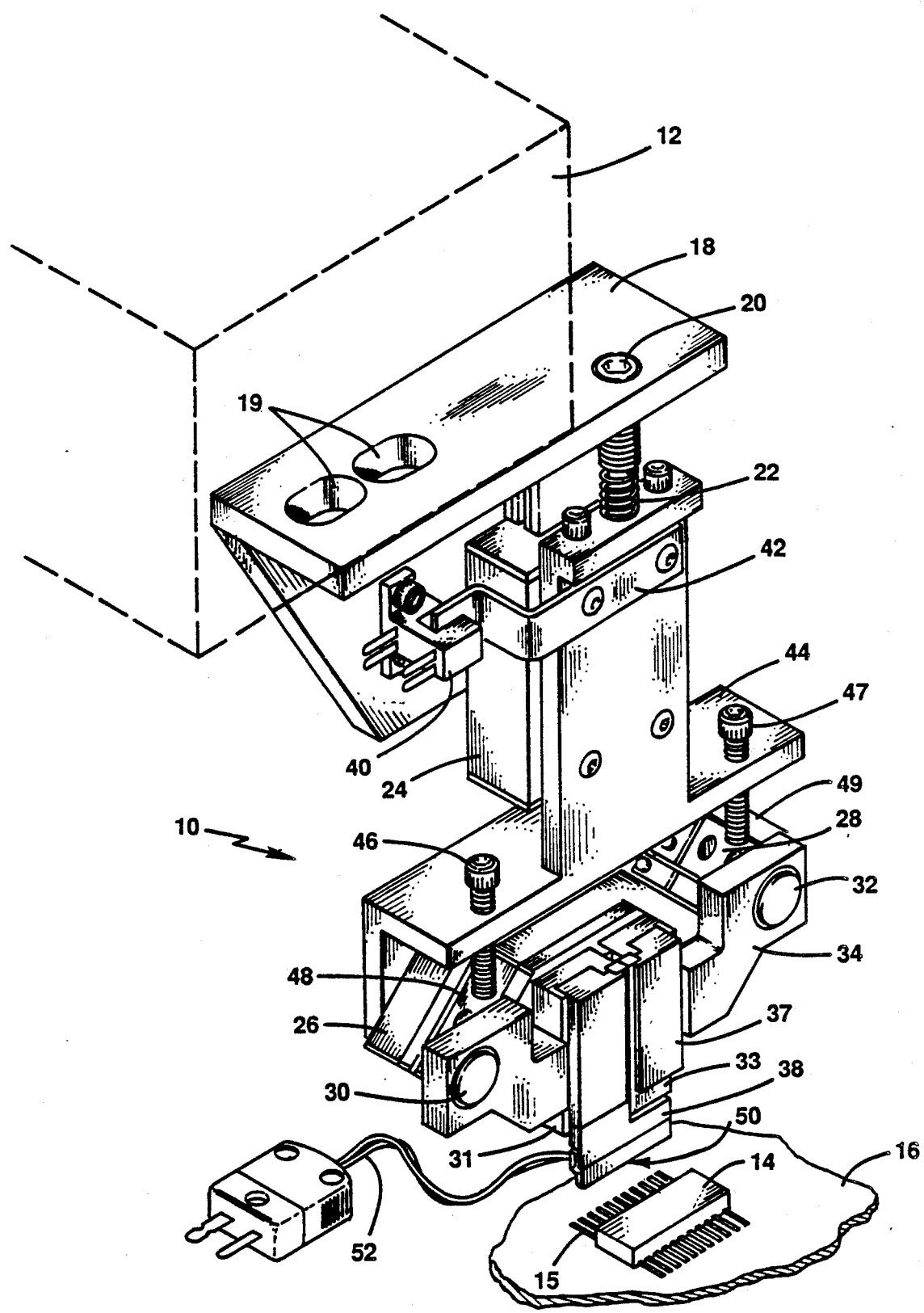
FIG. 1 is an isometric view of the compliant hot bar assembly of this invention positioned over a workpiece to be soldered and schematically showing a solder machine in dashed lines.

Referring to FIG. 1, there is shown an isometric view of a compliant hot bar soldering assembly 10 of this invention positioned over a workpiece comprising a multi-lead integrated circuit (I/C) device 14 having a plurality of leads 15 extending from at least one side of such device 14. A soldering machine 12 (illustrated by the dotted lines in FIG. 1) comprising the compliant hot bar assembly 10 performs a reflow soldering of the leads 15 onto pretinned pads on a double sided multi-layer board (MLB) 16 or any other similar printed circuit board readily known in the art. The soldering assembly 10 may also be used to unsolder such leads 15.

The compliant hot bar soldering assembly 10 is attached to the soldering machine 12 by a main mounting bracket 18 having two holes 19 for machine screws to secure the bracket 18 to the soldering machine 12. A vertical slide 24 is attached to the main mounting bracket 18 by two machine screws (not shown). A support plate 44 is attached to the vertical slide 24 using four (4) socket head cap screws 60. The top of the support plate has a hole for the positioning of one end of vertical force spring 22, the other end of which is attached to a force adjustment screw 20. The force adjustment screw 20 is inserted through a threaded hole in the top of the main mounting bracket 18. Also attached to the side of the main mounting bracket 18 is a sensor switch 40 which is activated by the movement of a sensor actuator plate 42 through a light beam in a side opening of the switch 40. The sensor actuator plate 42 is attached to the support plate 44 by two socket head cap screws. Two threaded holes 46, 47 are provided in the support plate 44 for insertion of set screws 48, 49. The set screws 48, 49 protrude downward towards the top of a rocking bracket 34 thereby limiting the movement of the rocking bracket 34. If it is desirable for a particular soldering application to convert from a compliant hot bar assembly 10 to a fixed hot bar assembly, the set screws 48, 49 are adjusted to provide a fixed position of the rocking bracket 34 and thus the hot bar 38.

Still referring to FIG. 1, the lower section of the support plate 44 has two angularly mounted slides 26, 28 attached to opposite sides of the support plate 44 in order to facilitate each slide interfacing with one of two pivot shafts 30, 32 extending from the rocking bracket 34. Mounted in the center of the rocking bracket 34 with four socket head cap screws 62 is a hot bar clamp assembly 37 into which is inserted a hot bar 38. Attached to the hot bar 38 are two leads 52 which connect to a thermocouple for controlling the temperature of the hot bar 38.

Figure 2:
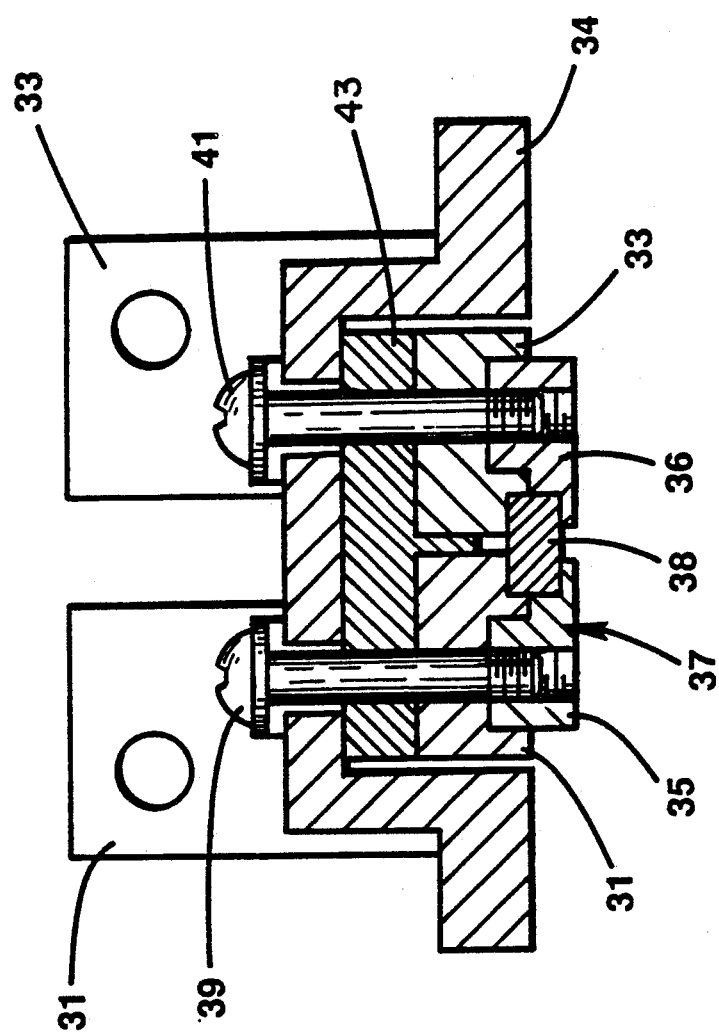
FIG. 2 is a cross-sectional top view of the hot bar clamp sub-assembly.

Referring now to FIG. 2 a cross-sectional top view of the hot bar clamp assembly 37 is shown mounted in the center section of the rocking bracket 34 with socket head cap screws 39, 41. The hot bar clamp assembly 37 comprises an insulator 35 disposed between the heater elements 31, 33 and the rocking bracket 34. Attached to the heater elements 31, 33 are hot bar clamps 35, 36 which hold in place the hot bar 38. Hot bar heater cables (not shown) are attached to the ends of heater elements 31, 33 which extend at a right angle away from the hot bar 38 below the hot bar clamp assembly 37.

The compliant hot bar soldering assembly 10 operating in accordance with the soldering machine 12 is moved downward until the hot bar 38 makes contact with the leads 15 of the device 14 to be soldered. As the hot bar 38 contacts an uneven surface, a force results which is applied to one end of the hot bar 38. This force causes one of the angularly mounted slides 26, 28 to move in an upward direction and the other slide to move in a downward direction. The hot bar pivots about a point 50 at the center of its base as a result of mounting the slides 26, 28 on a tangent to an arc defined by such pivot point 50. Downward force is applied by means of the soldering machine 12 compressing the vertical force spring 22 until a predetermined pressure is achieved. The hot bar 38 is now positioned for optimum thermal contact. When the hot bar 38 makes its initial contact with the leads 15 of the device 14 to be soldered, the sensor switch 40 is activated which provides a signal to initiate a "spring rate" program in the programmable soldering machine 12 readily known to one of ordinary skill in the art. The "spring rate" program controls the additional downward movement of the hot bar soldering assembly 10 thereby establishing the maximum desired downward force. A typical total downward force of the present embodiment is three pounds, which is determined by the particular soldering process being used. The soldering machine 12 initiates a soldering cycle when the predetermined downward force has been reached. The force adjustment screw 20 is adjusted initially to set the force at which the sensor switch 40 activates. This is particularly important when multiple hot bar are being used simultaneously so that uniform forces are applied to different groups of leads of a device 14 being soldered to an MLB 16.

Figure 3:
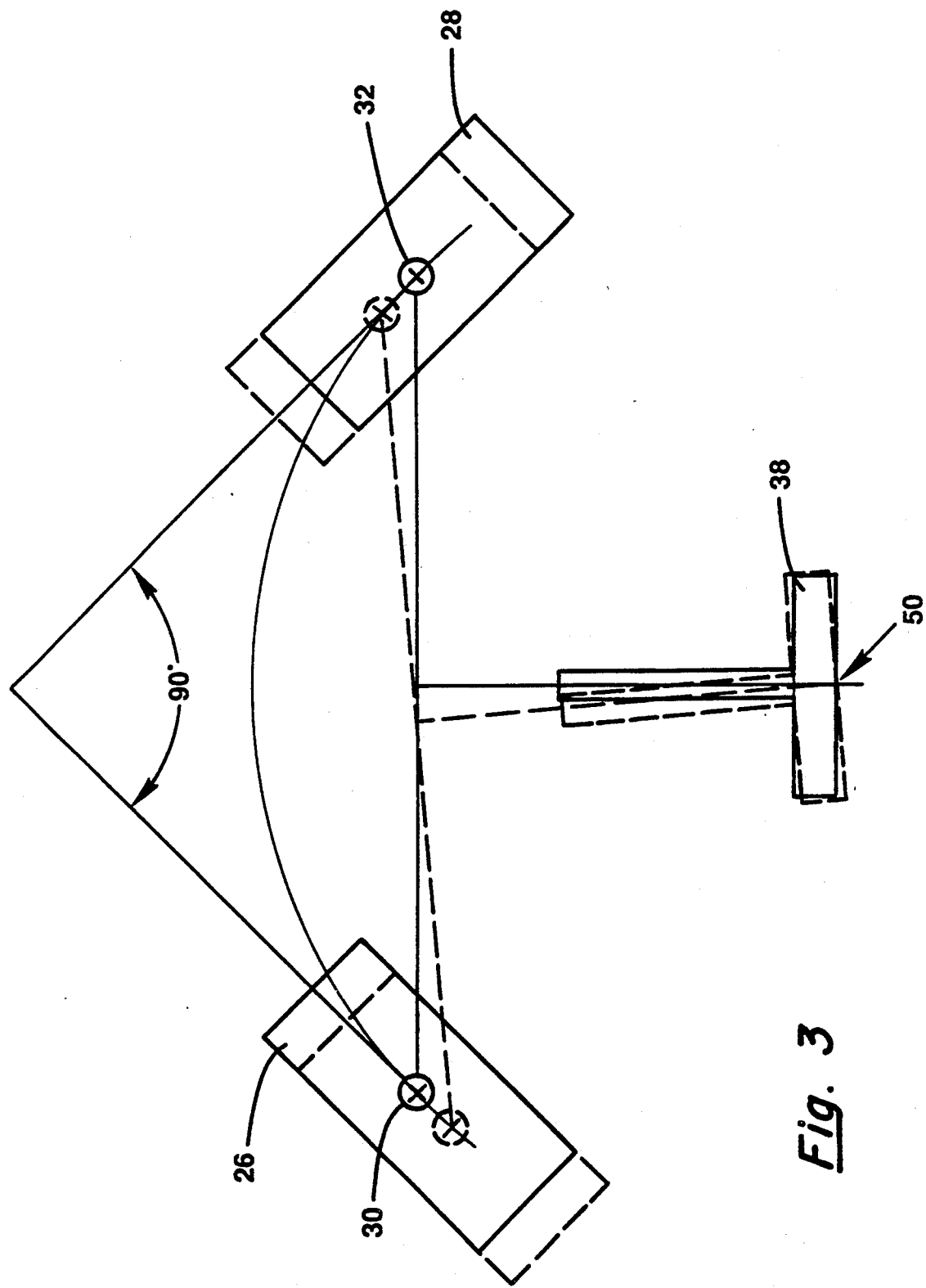
FIG. 3 illustrates the sliding pivot shafts of a rocking bracket and hot bar movement shown in dotted lines referenced to an original position.

Referring now to FIG. 3, the movement of the hot bar 38 about a pivot point 50 at the center of its base is illustrated by the solid lines in an initial position, and by the dotted lines showing the movement that occurs (with no side movement) due to a particularly non-uniform or uneven surface in contact with the hot bar 38, causing slide 26 to move downward and slide 28 to move upward. This arrangement of the rocking bracket 34 with pivot shafts 30 and 32 attached to angularly mounted slides 26 and 28 respectively with the hot bar clamp assembly 37 holding a hot bar 38 secured in the center of the rocking bracket 34 results in the pivot point 50 being at the center of the hot bar 38 base, and when movement occurs there is no lateral motion at the base of the hot bar 38. Any lateral motion generally causes the movement of the leads of the device being soldered resulting in a defective solder joint or no solder joint. In the preferred embodiment, as shown in FIG. 1, there may be a slight upward motion of approximately 0.0024 inches for the first two degrees of movement of the hot bar 38, but such movement has no detrimental effect on the quality of the soldering process.

Referring again to FIG. 1, the vertical slide 24 and the angularly mounted slides 26, 28 may be embodied by using slide assemblies Model Sl-1 and Model El respectively, manufactured by Del.Tron Precision, Inc., of Brookfield, Conn. The sensor switch 40 may be embodied by Model EE-SV3 manufactured by Omron of Schaumburg, Ill. The hot bar 38 may be embodied by Model MLS-900-F-TC manufactured by Hughes Aircraft Company of Los Angeles, CA. The programmable soldering machine 12 may be embodied by Model PM4C, manufactured by UNITEC of Monrovia, Calif.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A soldering assembly comprising:
   a main member;
   means for coupling a support member to said main member, said support member coupling means comprises a sliding means for coupling said support member to said main member, the motion of said sliding means being in a vertical direction; and
   soldering means including a hot bar, coupled to said support member, for providing said hot bar to a workpiece, said hot bar having a pivot point about the center of the base of said hot bar when contacting said workpiece.

2. The soldering assembly as recited in claim 1 wherein:
   said soldering means comprises means for moving said soldering means along an arc defined by said pivot point and a radius to said moving means for compliance with non-uniform surfaces of said workpiece.

3. The soldering assembly as recited in claim 1 wherein:
   said soldering means comprises means for providing electric power to said hot bar.

4. The soldering assembly as recited in claim 1 wherein said soldering means comprises:
   a rocking bracket having a first pivot shaft an a second pivot shaft disposed near each end of said rocking bracket;
   means for coupling said rocking bracket to said support member;
   said rocking bracket coupling means comprises a first sliding means attached to said first pivot shaft and a second sliding means attached to said second pivot shaft; and
   heating means mounted to said rocking bracket for heating said hot bar.

5. The solder assembly as recited in claim 4 wherein:
   said first sliding means and said second sliding means being disposed on said support member tangent to an arc defined by said pivot point and a common radius to said first sliding means and said second sliding means.

6. A soldering assembly comprising:
   a main member;
   means for coupling a support member to said main member;
   a rocking bracket having a first pivot shaft and a second pivot shaft;
   means for coupling said rocking bracket to said support member;
   said rocking bracket coupling means comprises a first sliding means attached to said first pivot shaft and a second sliding means attached to said second pivot shaft; and
   means mounted to said rocking bracket for clamping and heating a hot bar, said hot bar having a pivot point about the center of the base of said hot bar when contacting leads of a workpiece.

7. The soldering assembly as recited in claim 6 wherein:
   said support member coupling means comprises a sliding means for coupling said support member to said main member, the motion of said sliding means being in a vertical direction.

8. The soldering assembly as recited in claim 6 wherein said first sliding means and said second sliding means being disposed on said support member tangent to an arc defined by said pivot point and a common radius to said first sliding means and said second sliding means.

9. In combination:
   a plurality of hot bar soldering assemblies arranged on a programmable soldering machine to contact leads extending from at least two sides of a workpiece, each of said soldering assemblies comprises:
   a main member;
   means for coupling a support member to said main member to provide vertical motion between said support member and said main member;
   a rocking bracket having a first pivot shaft and a second pivot shaft;
   means for coupling said rocking bracket to said support member;
   said rocking bracket coupling means comprises a first sliding means attached to said first pivot shaft of said rocking bracket and a second sliding means attached to said second pivot shaft; and
   means mounted to said rocking bracket for clamping and heating a hot bar, said hot bar having a pivot point about the center of the beam of said hot bar when contacting said leads of said workpiece.

10. The combination as recited in claim 9 wherein said first sliding means and said second sliding means being disposed on said support member tangent to an arc defined by said pivot point and a common radius to said first sliding means and said second sliding means.

11. A method of soldering with a compliant hot bar soldering assembly comprising the steps of:

securing a main member of said assembly to a soldering apparatus;

coupling a support member to said main member to provide vertical motion between said support member and said main member;

coupling a rocking bracket to said support member, said rocking bracket having a first pivot shaft attached to a first sliding means on said support member and a second pivot shaft attached to a second sliding means on said support member;

disposing a hot bar in the center of said rocking bracket, said hot bar having a pivot point about the center of the base of said hot bar for compliance with non-uniform surfaces; and providing electric power from said soldering apparatus to said hot bar.

12. The method as recited in claim 11 wherein:

said step of coupling said rocking bracket to said support member further comprises the step of disposing said first sliding means and said second sliding means on said support member tangent to an arc defined by said pivot point and a common radius to said first sliding means and said second sliding means.

13. A method of automated soldering with a compliant hot bar soldering assembly comprising the steps of:

arranging a plurality of said compliant hot bar assemblies on a programmable soldering machine to contact leads extending from at least two sides of a workpiece;

mounting a main member of each of said soldering assemblies to said soldering machine;

coupling a rocking bracket to said support member of each soldering assembly, said rocking bracket having a first pivot shaft attached to a first sliding means on said support member and a second pivot shaft attached to a second sliding means on said support member;

disposing a hot bar in the center of said rocking bracket of each soldering assembly, said hot bar having a pivot point about the center of the base of said hot bar for compliance with non-uniform surfaces; and providing electric power from said soldering machine to each hot bar.

14. The method as recited in claim 13 wherein:

said step of coupling said rocking bracket to said support member of each soldering assembly further comprises the step of disposing said first sliding means and said second sliding means on said support member tangent to an arc defined by said pivot point and a common radius to said first sliding means and said second sliding means.

* * * * *